United States Patent

[11] 3,581,710

| [72] | Inventor | Carl W. Van Gilst<br>Goshen, Ind. |
|------|----------|-----------------------------------|
| [21] | Appl. No. | 793,025 |
| [22] | Filed | Jan. 22, 1969 |
| [45] | Patented | June 1, 1971 |
| [73] | Assignee | Bangor Punta Operations, Inc.<br>New York, N.Y. |

[54] SANITARY HOG WATERING TROUGH
8 Claims, 3 Drawing Figs.

[52] U.S. Cl. .................................................. 119/78,
 119/62
[51] Int. Cl. ................................................ A01k 07/00
[50] Field of Search ........................................ 119/72-
 —74, 78, 79, 80, 81, 62

[56] References Cited
UNITED STATES PATENTS

| 1,400,194 | 12/1921 | Whitnell ...................... | 119/73 |
| 1,777,577 | 10/1930 | Ritchie ........................ | 119/73 |
| 1,839,595 | 1/1932 | Ritchie ........................ | 119/73 |
| 2,532,999 | 12/1950 | Donahoe et al .............. | 119/73 |
| 2,590,266 | 3/1952 | Nelson ........................ | 119/81 |
| 2,635,580 | 4/1953 | Donahoe et al .............. | 119/73 |
| 3,027,872 | 4/1962 | Nelson ........................ | 119/81 |

*Primary Examiner*—Aldrich F. Medbery
*Attorneys*—Hobbs and Green and Kemon, Palmer and Estabrook ABSTRACT: A watering trough for hogs having a water pan with a perforated false bottom positioned above the principal bottom of the water pan through which dirt and other foreign matter pass and settle onto the principal bottom. The perforated bottom is connected to a cover for the pan and a cover for an automatic water valve which form a unitary structure pivotally connected to the rear side of the water pan to permit the false bottom and covers to be raised as a unit to permit access to the water pan for cleaning and servicing.

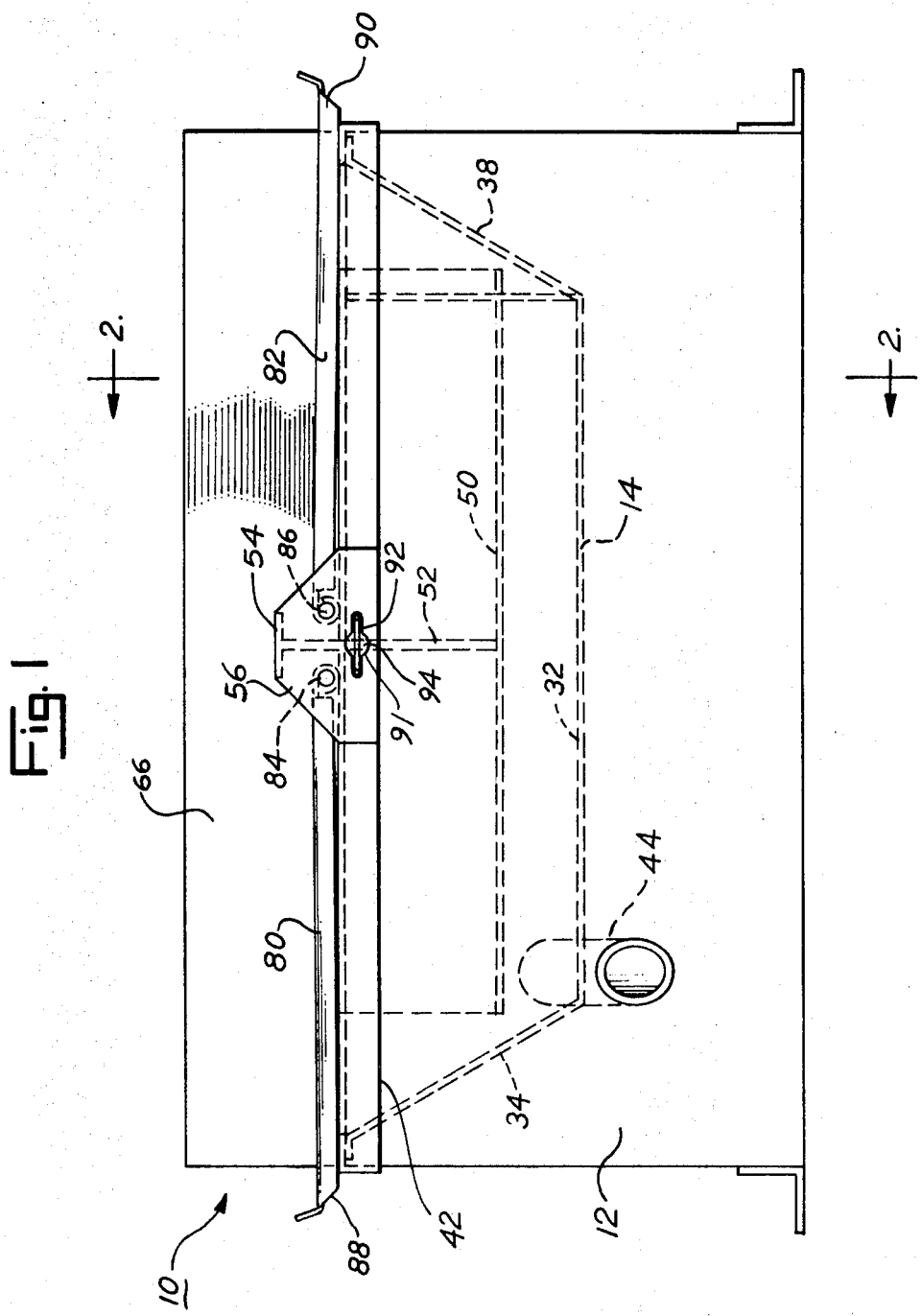

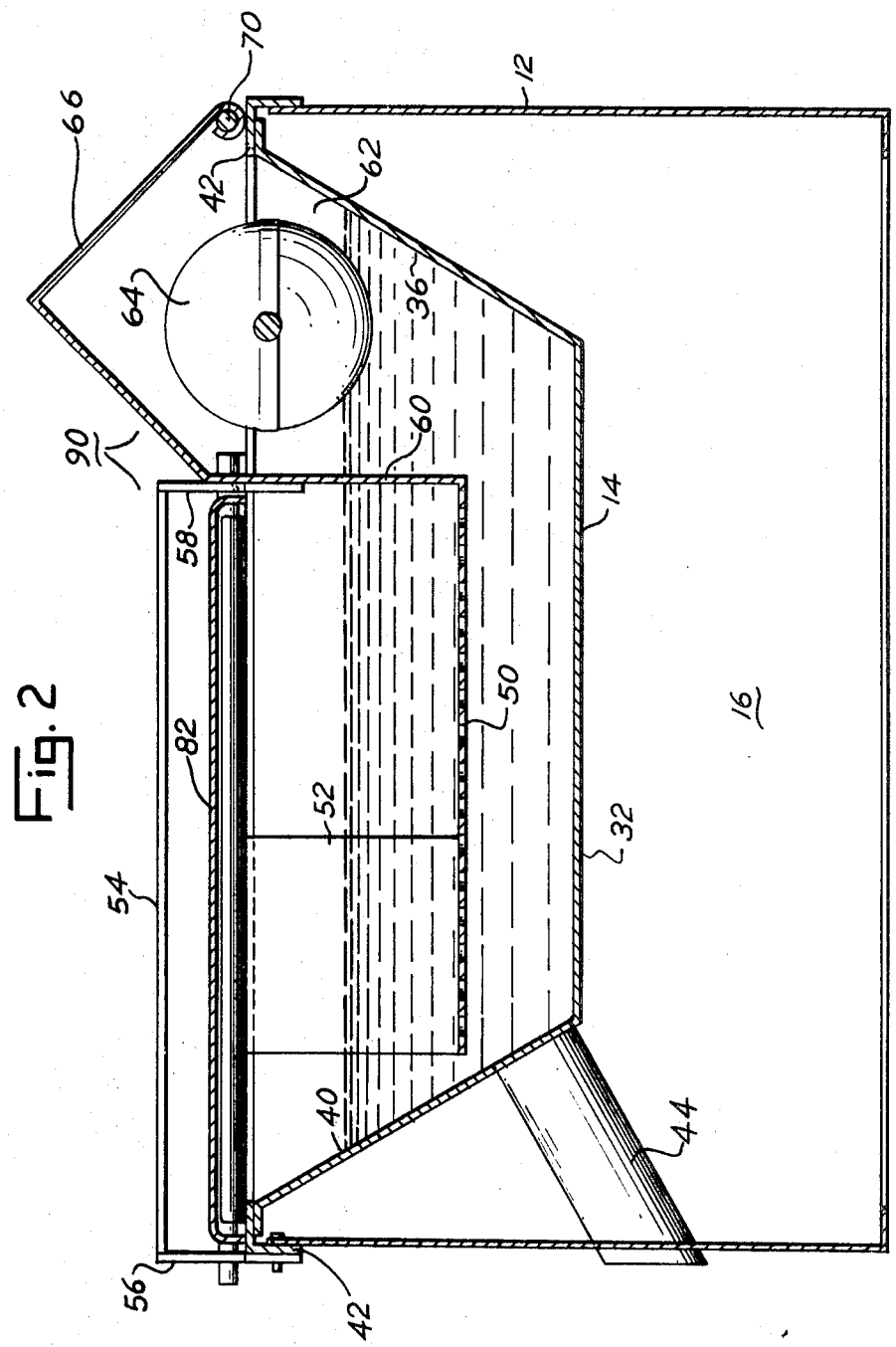

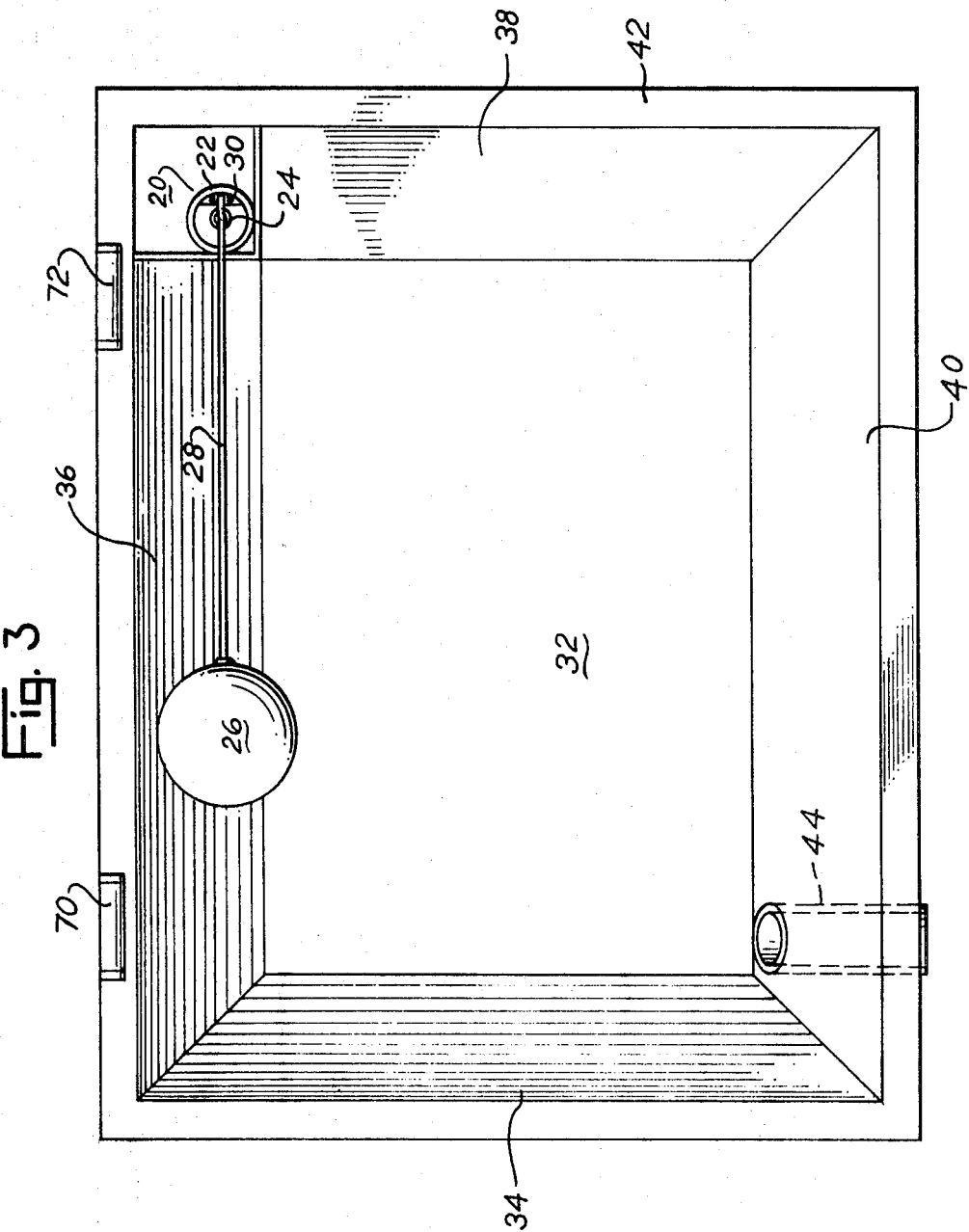

SANITARY HOG WATERING TROUGH

The simple and widely used hog troughs of conventional design permitted the hogs to foul the water by dropping dirt into the water and often by carrying dirt such as mud and grit into the trough by stepping into the trough or placing the front feet in the trough while they are drinking. This contaminates the water often to the extent that it is unsuitable and requires frequent changing. In order to overcome this and permit the hogs to use the trough freely without drinking the contaminated material, a trough has been developed which contains a false bottom effectively separating the mud and other foreign materials heavier than water from the water and permitting them to settle to the bottom of the main trough where they are out of reach of the hogs and where they can not be stirred up by the hogs to contaminate the water. While this type of hog trough has worked satisfactorily in providing a limited degree of sanitation in the hog drinking trough or fountain, it has been difficult to clean and remove the mud and other foreign materials since this type of trough is constructed of a number of different parts which must be disassembled in order to accomplish the cleaning operation. Because of the inconvenience, there is a tendency to neglect the cleaning operation and to permit an excessive amount of foreign material to collect in the trough. It is therefore one of the principal objects of the invention to provide a hog trough which contains a false bottom for separating the mud and other dirt from the drinking water, yet which is so constructed and designed that it can easily be cleaned and conveniently maintained in a sanitary condition.

Another object of the invention is to provide a covered hog watering trough which contains an enclosed automatic water supply mechanism and an easy drain arrangement, both of which can easily be reached by merely unlatching and pivoting a section of the trough structure rearwardly, thereby giving ready access to the accumulated foreign material and to the automatic water control mechanism, without having to disassemble and handle the various parts separately.

Still another object of the invention is to provide a relatively simple and easily maintained, sanitary hog watering trough or fountain which can readily be operated to open the unit to the parts requiring attention and which will be maintained securely latched in proper operating condition, preventing the hogs from dislodging or displacing the parts of the unit, yet permitting the operator to quickly open the unit to clean and service the parts thereof.

Further objects and advantages of the present invention will become apparent from the following description and accompanying drawings, wherein:

FIG. 1 is a front elevational view of the present hog trough or fountain;

FIG. 2 is a vertical cross-sectional view of the present hog trough or fountain, the section being taken on line 2-2 of FIG. 1; and FIG. 3 is a top plan view of the hog trough or fountain shown in the preceding figures with a portion of the upper section removed to better shown the internal construction.

Referring more specifically to the drawings and to FIG. 1 in particular, numeral 10 designates generally the present hog trough or fountain having a housing 12 and water pan 14 suspended in the housing in spaced relation to the bottom and four sides thereof. The housing forms the support for the water pan and also provides a chamber 16 for insulation and/or heat to maintain the temperature of the water in the water pan sufficiently high to prevent freezing and to provide the optimum temperature for consumption by the hogs. An electrical heating element, steam pipes or other suitable heating means may be disposed in chamber 16 to provide the necessary heat for the water. The water in the water pan is preferably supplied and controlled by an automatic inlet and valve means such as that schematically illustrated at numeral 20, consisting of an inlet tube 22, valve 24, controlled by a float ball 26 through an arm 28 pivoted on a pin 30 adjacent valve 24. The float ball floats on the water in the water pan and controls valve 24 in response to the water level in the pan. Various other types of automatic controls may be used, if desired; however, the type illustrated is relatively simple and is of standard construction and will operate satisfactorily under all normal conditions. The housing, which consists of the four walls and bottom, is preferably constructed of sheet metal or sheet iron, and the water pan, which consists of a bottom 32 and four side walls 34, 36, 38 and 40 formed integrally with the bottom and constructed of sheet metal, is suspended in chamber 16 by an angle iron frame 42 extending around the entire periphery of the pan and resting on and secured to the upper edge of the four walls of the housing. The water pan is provided with a drain tube 44 connected to and extending through side 40 and through the corresponding side of housing 12. The drain may be controlled by any suitable means such as a plug (not shown) inserted in the inner end of the tube.

A false bottom 50 is suspended in the water pan and contains a plurality of perforations which permit the mud, dirt and other foreign material to readily pass through the false bottom and to settle on bottom 32 of the water pan. The holes are sufficiently large to permit most foreign matter to readily pass therethrough, but will not permit the snout of the hog to reach the foreign material of the bottom of the water pan. As can be seen from FIG. 1, the false bottom extends substantially the full length of the lower portion of the watering pan, and, as can be seen from FIG. 2, extends a substantial distance from the front of the pan toward the rear thereof. The false bottom is supported by a center partition member 52 joined rigidly to the bottom and supported at the top by a crossmember 54 secured at opposite ends to fixtures 56 and 58. At the rear side of the false bottom is a vertical partition 60 which defines a separate chamber 62 for the operation of float ball 64 on the water in the pan. Partition 60 protects the float mechanism from the hogs and prevents excessive sloshing of the water in the pan which might otherwise adversely affect the operation of the float mechanism, causing the water level to rise above the desired line. Joined to or formed integrally with the partition is an inverted V-shaped float cover 66 extending substantially the full length of the trough structure. This cover, together with the partition 60 and the false bottom 50, forms a rigid unit along with support members 54, 56 and 58 which pivot as a unit on hinges 70 and 72 from the position shown in FIG. 2 to a position at the rear of the housing, thus fully exposing the water pan to permit the pan to easily and effectively be cleaned and the automatic watering control means to be conveniently serviced.

The trough is enclosed by a pair of covers 80 and 82 pivotally secured to the partition 52 by hinge structures 84 and 86, respectively. The two covers extend outwardly beyond the end of the housing as shown at numerals 88 and 90, respectively, thus permitting the hogs to use their snouts to raise the covers and extend their heads into the trough to reach the water above the false bottom. The covers extend from near the front edge of the water pan to a point in the proximity of partition 60; thus when either of the covers is opened, the respective half of the water trough is fully available to the hog. The rigid structural unit consisting of cover 66, partition 60, false bottom 50, partition 52 and members 54, 56 and 58, together with the two covers 80 an 82, forms a complete unit 90 which may be pivoted in the manner described herein from the position shown in FIG. 2 to a rearwardly extending position.

The unit consisting of the foregoing parts is held in its closed position above the watering pan by a latch mechanism indicated generally by numeral 91 and including a spring clip 92 which may be pushed inwardly by pressing the finger into hole 94 in member 56 to disengage the member from the spring clip, thus permitting the entire pivoted unit, including the false bottom, to be raised and tilted rearwardly.

In the use and operation of the present hog trough or fountain, the pan is filled with water to a point near the top thereof. When a hog uses the trough, it raises cover 80, for example, by extending its snout under extension 88 and then extending its snout into the compartment of pan 14 above the false bottom.

Any dirt carried into the water by the hog readily falls through the perforations in the false bottom 50 and settles onto bottom 32 of the water pan. The water is maintained at the desired level by the operation of float 26 in compartment 62. When the watering trough is to be cleaned, the latch 91 is operated to release the pivoted unit 90, including false bottom 50 and covers 66, 80 and 82, thereby permitting unit 90 to be tilted on hinges 70 and 72 from the position shown in FIG. 2 to the rear of the housing, thus fully exposing the water pan. The plug which has closed tube 44 is then removed and the water drained from the water pan. Mud and other sediment in the bottom of pan 32 may drain from the pan when the water drains through tube 44; however, any remaining foreign material can readily be washed or scooped from the pan. After the water pan has been cleaned, the unit indicated generally by numeral 90 is then tilted from its rearward position forwardly to its horizontal position over the water pan illustrated in FIG. 2.

One of the primary advantage of the present watering trough is the ease with which it can be cleaned as a result of the use of the complete unit 90 above the water pan, which permits the operator to remove the parts thereof as an integral structure rather than having to remove the various parts separately in order to clean and service the present trough. Various changes and modifications may be made in the present hog watering trough, including pivoting the doors 80 and 82 along the rear edge rather than at the center, thus permitting the hogs to open the trough from the front. Other changes, including a different type of automatic water control device, may be used in the present construction without departing from the scope of the invention.

I claim:

1. A watering trough for hogs comprising an open-top water pan, having sides and a bottom, a normally horizontally positioned panel spaced above the bottom of said pan and having holes therein to permit dirt to pass therethrough to the lower portion of said pan, a valve for controlling the water level in said pan disposed along one side thereof, a pair of animal actuating covers for said pan above said panel, a cover over said valve joined to said first-mentioned covers, means connecting said panel and said covers to form a separate structure to permit said panel and said covers to be removed from and returned to said pan as a unit, a hinge means supporter on said pan and pivotally connecting said separate structure along the rear side of said water pan, and a hinge means on said separate structure positioned transversely to said first-mentioned hinge means for the covers above said panel.

2. A watering trough for hogs as defined in claim 1 in which said valve for controlling the water level in said pan includes a float along the rear side thereof.

3. A watering trough for hogs as defined in claim 2 in which said first-mentioned hinge means pivotally connects the cover above said valve and float to the rear side of said water pan.

4. A watering trough for hogs as defined in claim 3 in which said cover for said valve and float, said panel and said first-mentioned covers are permanently connected to one another and are pivotally connected to the rear side of said watering pan.

5. A watering trough for hogs as defined in claim 4 in which one of said first-mentioned covers closes only one-half of said water pan and the other of said covers closed the other half of said water pan and said covers are pivoted by said hinge disposed in the direction from front to rear of the water pan.

6. A watering trough for hogs as defined in claim 1 in which a housing surrounds the under side of said water pan.

7. A watering trough for hogs as defined in claim 4 in which a housing surrounds the under side of said water pan.

8. A watering trough for hogs as defined in claim 7 in which a latch means secures said separate structure to said housing to retain said structure in its operable position and to prevent accidental displacement and dislodgement thereof by the hogs.